United States Patent
Ono et al.

(10) Patent No.: US 12,206,161 B2
(45) Date of Patent: Jan. 21, 2025

(54) VEHICULAR ANTENNA DEVICE

(71) Applicant: YOKOWO CO., LTD., Tokyo (JP)

(72) Inventors: Motohisa Ono, Tomioka (JP); Satoshi Iwasaki, Tomioka (JP); Noritaka Terashita, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 152 days.

(21) Appl. No.: 17/802,158

(22) PCT Filed: Feb. 25, 2021

(86) PCT No.: PCT/JP2021/007016
§ 371 (c)(1),
(2) Date: Aug. 25, 2022

(87) PCT Pub. No.: WO2021/172403
PCT Pub. Date: Sep. 2, 2021

(65) Prior Publication Data
US 2023/0077546 A1    Mar. 16, 2023

(30) Foreign Application Priority Data

Feb. 26, 2020    (JP) ................................. 2020-030341

(51) Int. Cl.
*H01Q 1/32*    (2006.01)
*H01Q 9/04*    (2006.01)
*H01Q 21/30*   (2006.01)

(52) U.S. Cl.
CPC ......... *H01Q 1/3275* (2013.01); *H01Q 9/0407* (2013.01); *H01Q 21/30* (2013.01)

(58) Field of Classification Search
CPC ..... H01Q 1/3275; H01Q 9/0407; H01Q 21/30
See application file for complete search history.

(56) References Cited

U.S. PATENT DOCUMENTS

| 10,418,696 B2 | 9/2019 | Tashiro |
| 10,978,794 B2 | 4/2021 | Terashita et al. |
| 2015/0071137 A1* | 3/2015 | Thiam .................. H01Q 1/521 343/702 |
| 2017/0093028 A1 | 3/2017 | Tashiro |

(Continued)

FOREIGN PATENT DOCUMENTS

| JP | 1-144702 A | 6/1989 |
| JP | 2001-208823 A | 8/2001 |

(Continued)

OTHER PUBLICATIONS

International Search Report and Written Opinion mailed on Apr. 20, 2021, received for PCT Application PCT/JP2021/007016, filed on Feb. 25, 2021, 11 pages including English Translation.

(Continued)

*Primary Examiner* — Graham P Smith
(74) *Attorney, Agent, or Firm* — XSENSUS LLP

(57) ABSTRACT

A vehicular antenna device (10) includes an antenna base (100) and a first antenna portion (a first satellite antenna (210) or a second satellite antenna (220)). The antenna base (100) has a longitudinal direction. The first antenna portion is provided over the antenna base (100). The satellite antennas are disposed offset in a direction intersecting a virtual plane parallel or substantially parallel with the longitudinal direction.

10 Claims, 9 Drawing Sheets

(56) References Cited

U.S. PATENT DOCUMENTS

| | | |
|---|---|---|
| 2017/0229767 A1 | 8/2017 | Suffolk et al. |
| 2019/0280372 A1 | 9/2019 | Terashita et al. |
| 2021/0194113 A1 | 6/2021 | Terashita et al. |

FOREIGN PATENT DOCUMENTS

| | | |
|---|---|---|
| JP | 2007-43648 A | 2/2007 |
| JP | 2011-250108 A | 12/2011 |
| JP | 3178938 U | 10/2012 |
| JP | 2017-69703 A | 4/2017 |
| JP | 2020-048175 A | 3/2020 |
| WO | 2018/105235 A1 | 6/2018 |

OTHER PUBLICATIONS

Notice of Reasons for Refusal mailed Apr. 9, 2024, in Japanese Application No. 2020-030341, 6 pages. (with translation).

* cited by examiner

FIG. 8
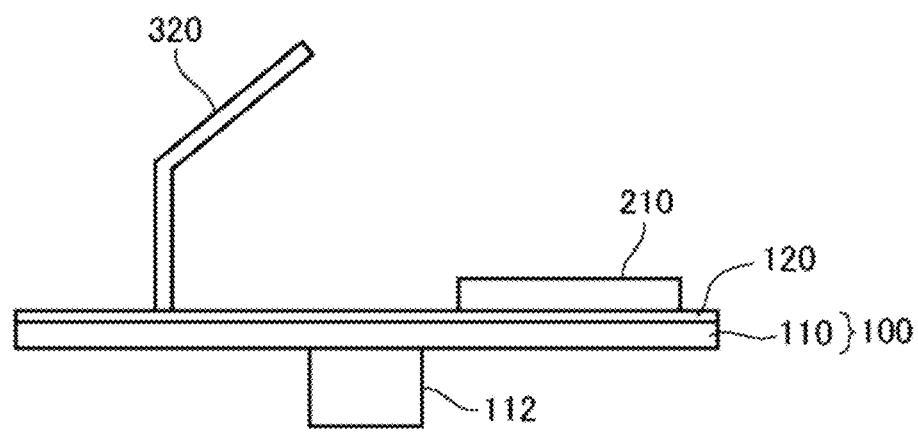
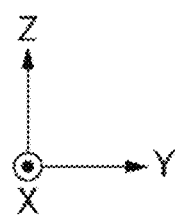

VEHICULAR ANTENNA DEVICE

CROSS-REFERENCE TO RELATED APPLICATIONS

The present application is based on PCT filing PCT/JP2021/007016, filed Feb. 25, 2021, which claims priority to JP 2020-030341, filed Feb. 26, 2020, the entire contents of each are incorporated herein by reference.

TECHNICAL FIELD

Embodiments of the present invention relate to a vehicular antenna device.

BACKGROUND ART

In recent years, various vehicular antenna devices to be attached to the roof of an automobile have been developed. For example, in the vehicular antenna device described in Patent Document 1, a low-profile antenna device with an antenna case configured with a shark fin shape is disclosed. In this low-profile antenna device, a patch antenna is mounted on the front side of the antenna base. The patch antenna receives, for example, radio waves in the Global Positioning System (GPS) wave band or radio waves in the Satellite Digital Audio Radio Service (SDARS) wave band.

RELATED DOCUMENT

Patent Document
  Patent Document 1: Japanese Unexamined Patent Publication No. 2017-69703

SUMMARY OF THE INVENTION

Technical Problem

An example of an object of the embodiment is to improve the characteristics of an antenna mounted on the roof of an automobile.

Solution to Problem

An aspect of the present embodiment is a vehicular antenna device including:
  an antenna base having a longitudinal direction; and
  a first antenna portion provided over the antenna base, in which
  the first antenna portion is disposed offset in a direction intersecting a virtual plane parallel to the longitudinal direction.

Another aspect of the present invention is a vehicular antenna device including:
  an antenna base; and
  a first antenna portion provided on the antenna base, in which
  a center of the first antenna portion is disposed offset in a left-right direction with respect to a center line along a front-rear direction of the antenna base when viewed from a top of the antenna base.

Advantageous Effects of Invention

According to the above aspect of the present embodiment, the characteristics of the antenna mounted on the roof of an automobile can be improved.

BRIEF DESCRIPTION OF THE DRAWINGS

FIG. 8 is a schematic front view showing an example of a vehicular antenna device according to a modification example.

DESCRIPTION OF EMBODIMENTS

Figure 1:
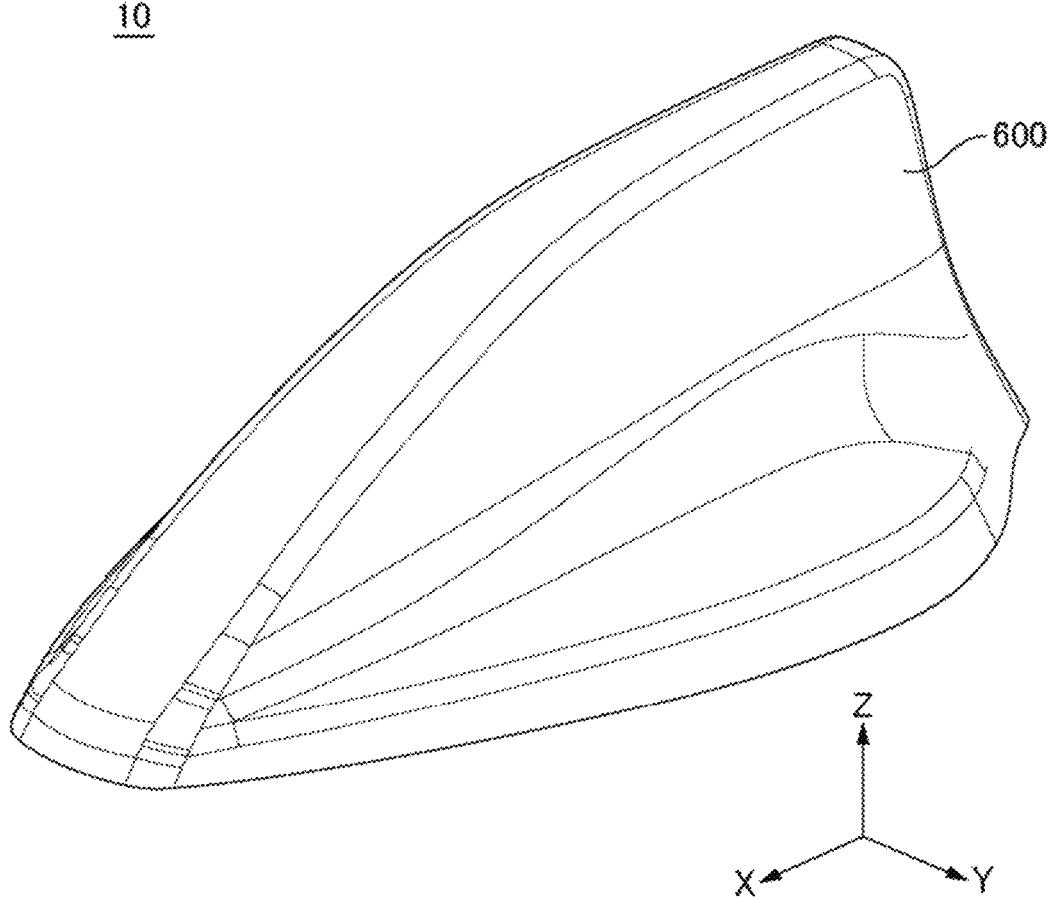
FIG. 1 is a perspective view showing an example of a vehicular antenna device according to an embodiment.

Hereinafter, embodiments of the present invention will be described with reference to the drawings. In all drawings, similar components are designated by the same reference numerals, and description thereof will not be repeated as appropriate.

In the present specification, the ordinal numbers such as "first", "second", and "third" are added only to distinguish the components having the same names unless otherwise specified, and do not mean a particular feature (for example, order or importance) of the component.

Figure 2:
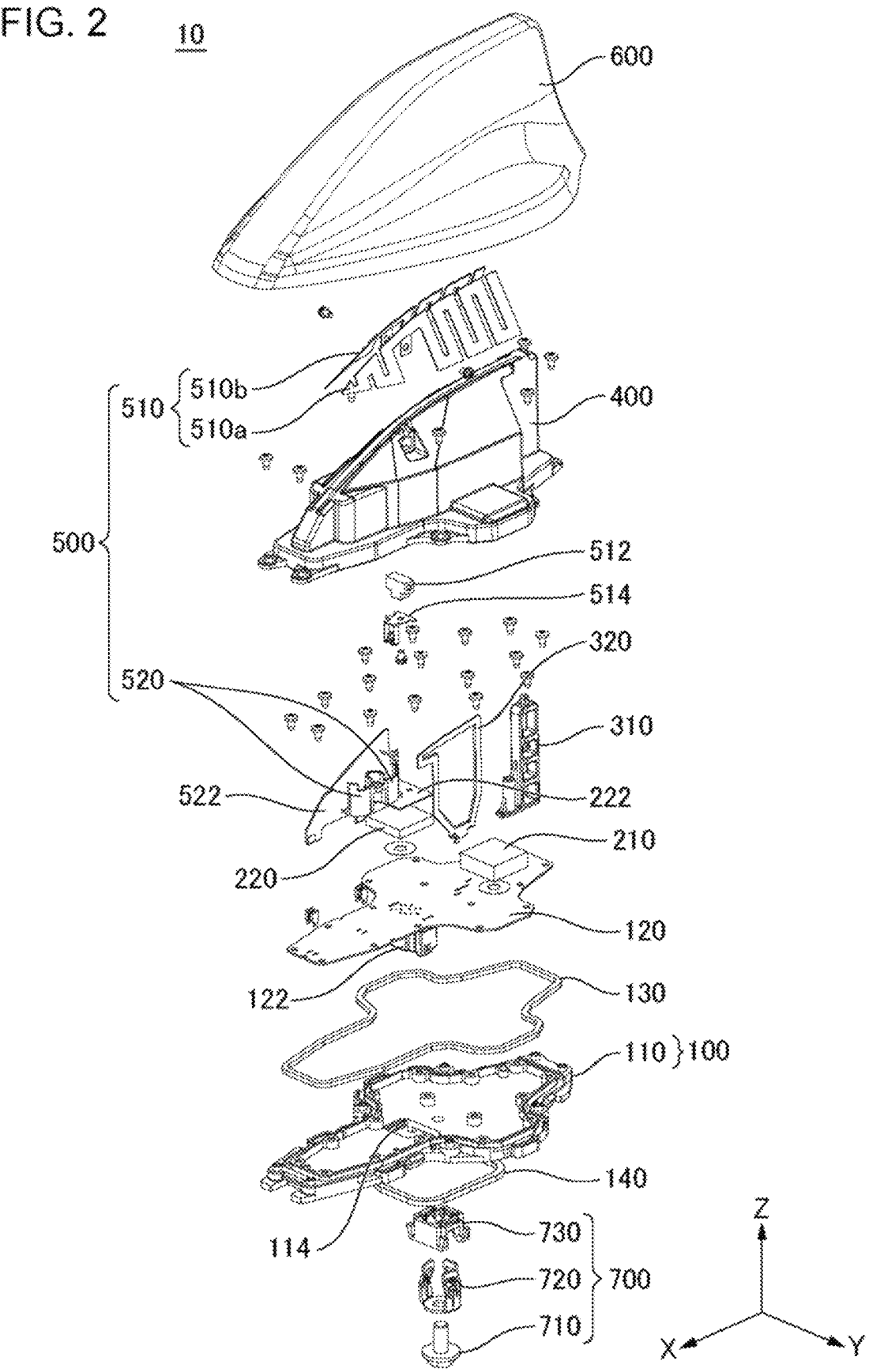
FIG. 2 is an exploded perspective view showing an example of the vehicular antenna device according to the embodiment.
Figure 3:
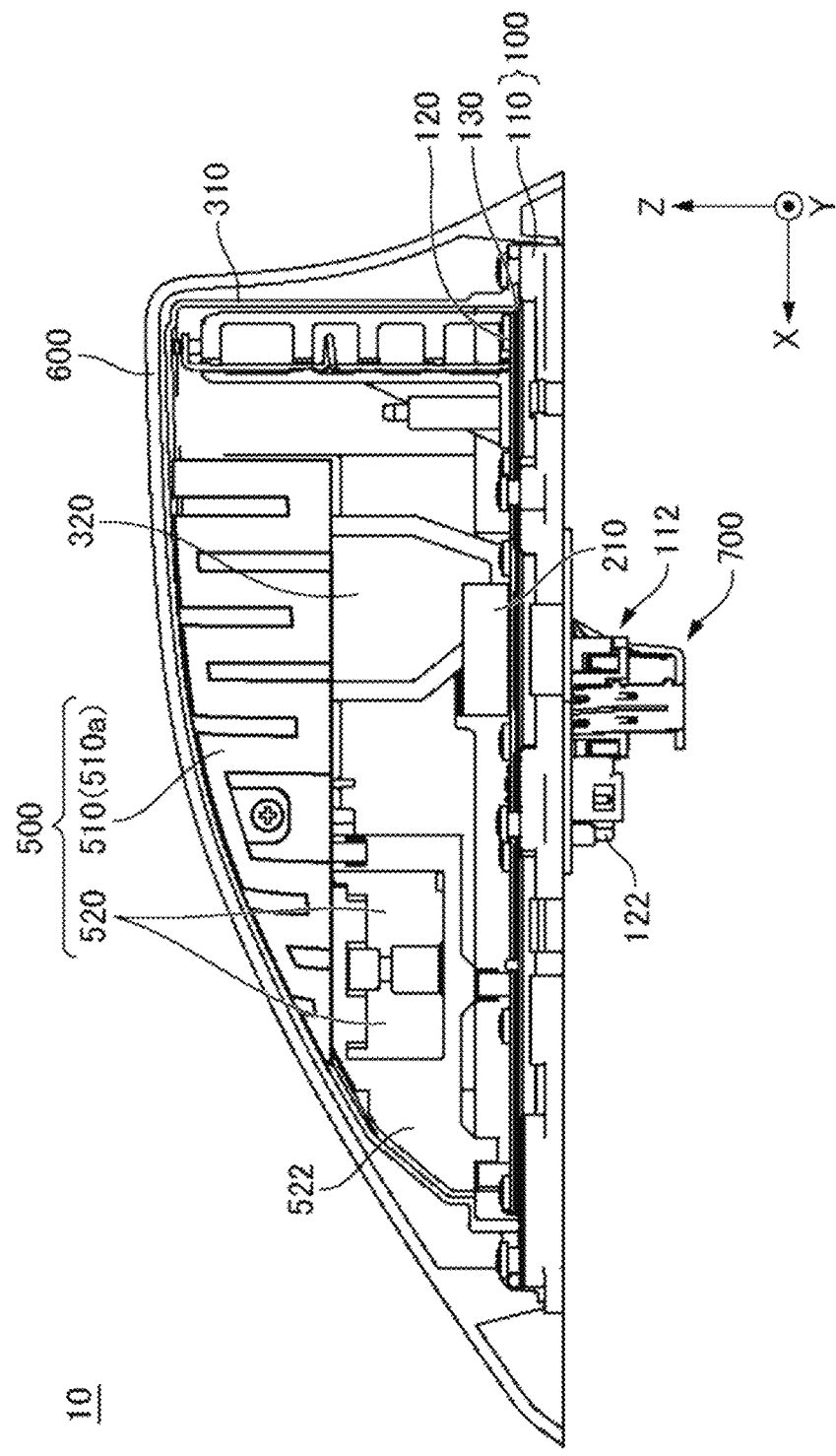
FIG. 3 is a left side view showing an example of the vehicular antenna device according to the embodiment with the left portion of an inner case and the left portion of an antenna case removed.
Figure 4:
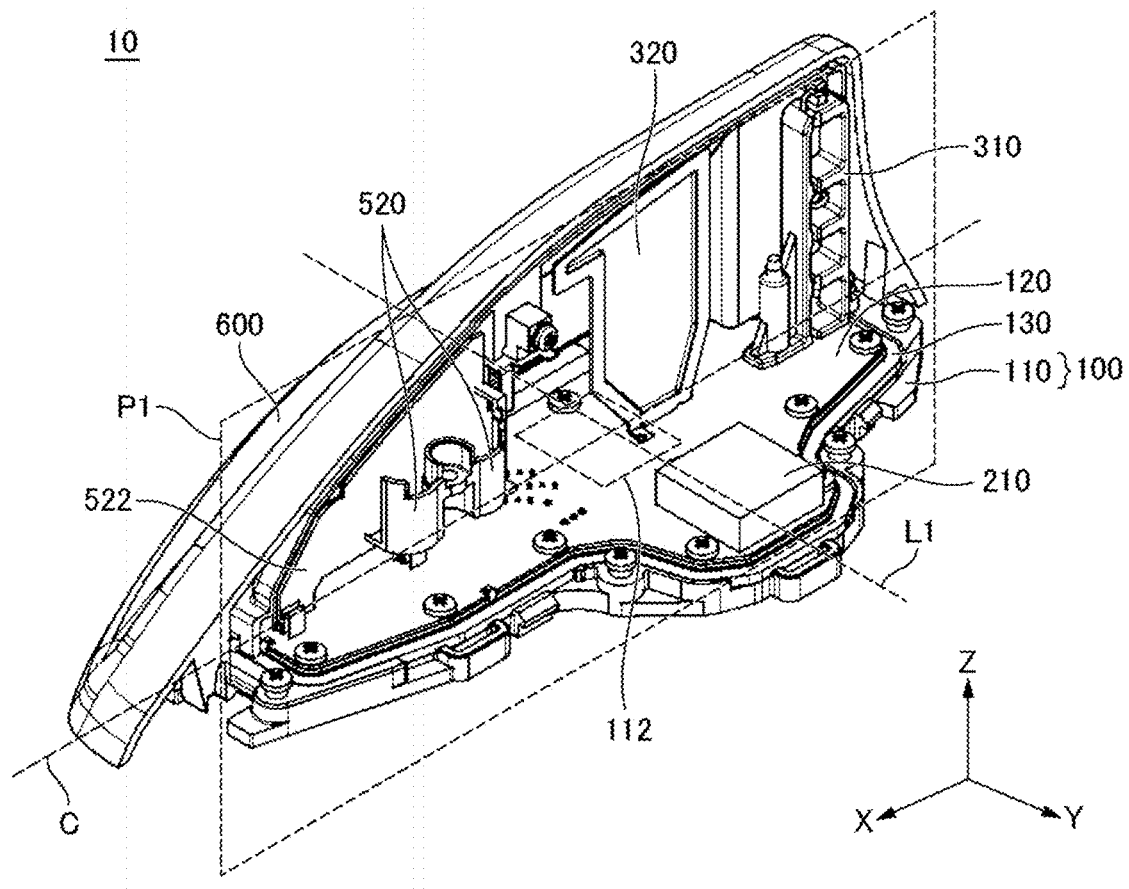
FIG. 4 is a perspective view showing an example of the vehicular antenna device according to the embodiment with the left portion of the inner case, a capacitive loading element, and the left portion of the antenna case removed.

FIG. 1 is a perspective view of a vehicular antenna device 10 according to the embodiment. FIG. 2 is an exploded perspective view showing an example of the vehicular antenna device 10 according to the embodiment. FIG. 3 is a left side view showing an example of the vehicular antenna device 10 according to the embodiment with the left portion of an inner case 400 and the left portion of an antenna case 600 removed. FIG. 4 is a perspective view showing an example of the vehicular antenna device 10 according to the embodiment with the left portion of the inner case 400, a capacitive loading element 510, and the left portion of the antenna case 600 removed.

In FIGS. 1 to 4, the first direction X, the second direction Y, and the third direction Z indicate the front-rear direction, the left-right direction, and the up-down direction of the vehicular antenna device 10, respectively. Specifically, the positive direction of the first direction X is the direction of the arrow indicating the first direction X, and indicates the front direction of the vehicular antenna device 10. The negative direction of the first direction X is the opposite direction of the arrow indicating the first direction X, and indicates the rear direction of the vehicular antenna device 10. The positive direction of the second direction Y is the direction of the arrow indicating the second direction Y, and indicates the left direction of the vehicular antenna device 10. The negative direction of the second direction Y is the opposite direction of the arrow indicating the second direction Y, and indicates the right direction of the vehicular antenna device 10. In FIG. 3, the white circle with a black dot indicating the second direction Y indicates that the positive direction of the second direction Y is a direction from the back to the front of the paper surface of FIG. 3, and the negative direction of the second direction Y is a direction from the front to the back of the paper surface of FIG. 3. The positive direction of the third direction Z is the direction of the arrow indicating the third direction Z, and indicates the upward direction of the vehicular antenna device 10. The negative direction of the third direction Z is the opposite direction of the arrow indicating the third direction Z, and indicates the downward direction of the vehicular antenna device 10. The "front", "rear", "left", "right", "top" and "bottom" referred to here are determined by the automobile on which the vehicular antenna device 10 is mounted. That is, the front direction is the forward direction of the automobile, and the rear direction is the backward direction of the automobile. The left direction is the left direction when viewed from the rear side to the front side of the automobile, and the right direction is the right direction when viewed from the rear side to the front side of the automobile. The upward direction is the upward direction of the automobile, and the downward direction is the downward direction of the automobile.

Hereinafter, the first direction X, the second direction Y, and the third direction Z are referred to, as necessary, as the front-rear direction, the left-right direction, and the up-down direction respectively of the vehicular antenna device 10 or the members configuring the vehicular antenna device 10, such as the antenna base 100, the inner case 400, and the antenna case 600. The positive direction of the first direction X, the negative direction of the first direction X, the positive direction of the second direction Y, the negative direction of the second direction Y, the positive direction of the third direction Z, and the negative direction of the third direction Z are referred to, as necessary, as the front direction, the rear direction, the left direction, the right direction, the upward direction, and the downward direction respectively of the vehicular antenna device 10, or the members configuring the vehicular antenna device 10, such as the antenna base 100, the inner case 400, and the antenna case 600.

As shown in FIGS. 2 to 4, the vehicular antenna device 10 includes an antenna base 100, a first substrate 120, a pad 130, a first satellite antenna 210, a second satellite antenna 220, a first antenna 310, a second antenna 320, an inner case 400, a third antenna 500, an antenna case 600, and an antenna attaching portion 700. The first satellite antenna 210 and the second satellite antenna 220 are examples of the first antenna portion, and the first antenna 310, the second antenna 320, the inner case 400, and the third antenna 500 are examples of the second antenna portion.

The antenna case 600 is a member covering members configuring the vehicular antenna device 10, and is a resin molded product made of a synthetic resin or the like having non-translucency and radio wave transparency. The antenna case 600 has, for example, a shark fin shape inclined such that the front side of the first direction X is lower than the rear side of the first direction X and both side surfaces are curved inward. The antenna case 600 has an opened lower surface, and covers the inner case 400 and the like from above in the third direction Z. The first satellite antenna 210, the second satellite antenna 220, the first antenna 310, the second antenna 320, the inner case 400, and the third antenna 500, for example, are accommodated in the space formed by the antenna case 600 and the antenna base 100.

The inner case 400 is a resin molded product made of a synthetic resin or the like having radio wave transparency, and has an opened lower surface to cover the antenna base 100 or the like from above in the third direction Z. The first satellite antenna 210, the second satellite antenna 220, the first antenna 310, and the second antenna 320, for example, are accommodated in the space formed by the inner case 400 and the antenna base 100.

The antenna base 100 has a metal base 110. The metal base 110 and the first substrate 120 have a longitudinal direction in the first direction X. The metal base 110 and the first substrate 120 have a transverse direction in the second direction Y. That is, the length of the antenna base 100 in the first direction X is longer than the length of the antenna base 100 in the second direction Y. The metal base 110 and the first substrate 120 have thickness in the third direction Z. The longitudinal direction of the antenna base 100 may be referred to as the front-rear direction, and the transverse direction thereof may be referred to as the left-right direction.

A connector 122 is provided on the lower surface of the first substrate 120. The first substrate 120 is mounted on the upper surface of the metal base 110. The metal base 110 is formed with a hole 114 through which the connector 122 is passable. When the first substrate 120 is attached to the metal base 110, the connector 122 penetrates through the hole 114 of the metal base 110 and projects downward from the lower surface of the metal base 110. The pad 130 is disposed on the metal base 110 and is located on the outer periphery of the first substrate 120. A space between the metal base 110 and the inner case 400 is filled and waterproofed by the pad 130.

The antenna base 100 is mounted over the roof of the automobile via the seal member 140, and is fixed to the roof of the automobile by the antenna attaching portion 700. The seal member 140 is an annular elastic member such as an elastomer, urethane, or rubber. The seal member 140 is clamped between the lower surface of the antenna base 100 and the vehicle body (for example, the vehicle roof) to which the vehicular antenna device 10 is attached, and provides watertight sealing between the lower surface and the vehicle body.

Specifically, the lower surface of the metal base 110 is provided with a fixing portion 112 projecting downward (in the negative direction of the third direction Z). The fixing portion 112 is conductive and is, for example, a conductive block such as a metal block. As long as the fixing portion 112 is conductive, the antenna base 100 may be configured to include an insulating member in a part thereof, or the entire antenna base 100 may be configured with conductive members. A screw hole is formed on the tip surface (the surface on the negative direction side of the third direction Z) of the fixing portion 112.

An example of a method of fixing the antenna base 100 by the antenna attaching portion 700 is as follows. First, a washer 720 and a holder 730 of the antenna attaching portion 700 are attached to the fixing portion 112 of the antenna base 100. Next, a bolt 710 of the antenna attaching portion 700 is inserted into the screw hole formed on the lower surface of the fixing portion 112 of the antenna base 100. Thus, the bolt 710, the washer 720, and the holder 730 are temporarily fixed to the fixing portion 112 of the antenna base 100. Next, the antenna base 100 is mounted on the upper surface of the roof via the seal member 140. At this time, the fixing portion 112 of the antenna base 100 and the antenna attaching portion 700 temporarily fixed to the fixing portion 112 are passed from the upper surface of the roof into the mounting hole formed in the roof, and the vehicular antenna device 10 is temporarily fixed to the roof by the holder 730. Next, by further tightening the bolt 710, the claw portion of the washer 720 is brought into contact with the lower surface of the roof, and the antenna base 100 is fixed to the roof.

The first satellite antenna 210, the second satellite antenna 220, the first antenna 310, the second antenna 320, and the second substrate 522 are provided on the upper surface of the first substrate 120. The first satellite antenna 210, the second satellite antenna 220, the first antenna 310, the second antenna 320, and the second substrate 522 are covered with the inner case 400. A capacitive loading element 510 is attached to the inner case 400. The inner case 400 and the third antenna 500 are covered with the antenna case 600.

The first antenna 310 is, for example, a Vehicle-to-Everything (V2X) antenna. The first antenna 310 may be a shared antenna of Wi-Fi (registered trademark) or Bluetooth (registered trademark) and V2X, or may be a shared antenna of V2X with another antenna operating in another frequency band. When the first antenna 310 is a shared antenna, the vehicular antenna device 10 is further miniaturized. The first antenna 310 may be a shared antenna of Wi-Fi (registered trademark) or Bluetooth (registered trademark) and V2X, or may be a shared antenna of TEL and V2X. When the first antenna 310 is a shared antenna, further miniaturization becomes possible. The first antenna 310 is located on the rear side of the antenna base 100. That is, the first antenna 310 is located on the negative direction side of the first direction X from the center of the antenna base 100 in the first direction X. The first antenna 310 is covered with the inner case 400. Accordingly, the height of the first antenna 310 in the third direction Z is limited by the height of the inner case 400 in the third direction Z. The height of the inner case 400 on the rear side of the antenna base 100 is higher than the height of the inner case 400 on the front side of the antenna base 100. Thus, the height of the first antenna 310 can be increased as compared with the case where the first antenna 310 is located on the front side of the antenna base 100. This results in increasing the degree of freedom for adjusting the first antenna 310 to the desired antenna performance.

The second antenna 320 is, for example, a Telephone (TEL) antenna. The second antenna 320 is located on the negative direction side of the first direction X from the center of the antenna base 100, and is located on the positive direction side of the first direction X from the position of the first antenna 310. The second antenna 320 is disposed between the first satellite antenna 210 and the second satellite antenna 220 in the second direction Y. The second antenna 320 is covered with the inner case 400. Accordingly, the height of the second antenna 320 in the third direction Z is limited by the height of the inner case 400 in the third direction Z. The height of the inner case 400 on the rear side of the antenna base 100 is higher than the height of the inner case 400 on the front side of the antenna base 100. Thus, the height of the second antenna 320 can be increased as compared with the case where the second antenna 320 is located on the front side of the antenna base 100. This results in increasing the degree of freedom for adjusting the second antenna 320 to the desired antenna performance.

The first antenna 310 and the second antenna 320 are located on the same straight line extending along the first direction X. The first antenna 310 and the second antenna 320 however may be disposed offset from each other in the second direction Y.

The width of the portion of the inner case 400 covering the first antenna 310 in the second direction Y is close to the width of the first antenna 310 in the second direction Y. For example, the width is more than 100% and 110% or less of the width of the first antenna 310 in the second direction Y. When there is a gap of a certain size between the inner surface of the inner case 400 and the first antenna 310, the radio waves of the first antenna 310 may be reflected by a material such as resin configuring the inner case 400. In the present embodiment, the reflection of radio waves of the first antenna 310 can be prevented by making the size of the gap between the inner surface of the inner case 400 and the first antenna 310 smaller than a certain size. Thus, the directivity of the first antenna 310 can be uniform as compared with the case where there is a gap of a certain size between the inner surface of the inner case 400 and the first antenna 310.

The third antenna 500 is, for example, an Amplitude Modulation/Frequency Modulation (AM/FM) radio antenna. The third antenna 500 has a capacitive loading element 510 and a helical element 520. The capacitive loading element 510 and the helical element 520 enable the third antenna 500 to receive AM/FM broadcasts. The capacitive loading element 510 includes a first element 510a and a second element 510b. The first element 510a is attached to the left side surface of the inner case 400. The second element 510b is attached to the right side surface of the inner case 400. The first element 510a and the second element 510b are electrically connected via the coupling member 512. The helical element 520 is disposed on the second substrate 522. The capacitive loading element 510 and the helical element 520 are electrically connected. Specifically, the coupling member 512 is connected to a connecting member 514, and the connecting member 514 is connected to the helical element 520.

Each of the first element 510a and the second element 510b of the capacitive loading element 510 has a meander shape. Each element of the capacitive loading element 510 has a vertical meander shape with a vertically folded structure. The electrical length of the capacitive loading element 510 adjusted according to such a shape can reduce the electrical interference between the first satellite antenna 210 and the third antenna 500 and the electrical interference between the second satellite antenna 220 and the third antenna 500. The electrical interference includes radio wave interference and impedance interference. The second antenna 320 is disposed below the capacitive loading element 510. The capacitive loading element 510 divided into two elements having a meander shape can reduce radio wave interference with the second antenna 320.

The first satellite antenna 210 and the second satellite antenna 220 are disposed outside the region where the capacitive loading element 510 is projected onto the antenna base 100. In other words, the first satellite antenna 210 and the second satellite antenna 220 do not overlap in the third direction Z. Specifically, the first satellite antenna 210 is disposed offset from the first element 510a, specifically, the rear portion of the first element 510a, to the positive direction side of the second direction Y when viewed from the third direction Z. The second satellite antenna 220 is disposed offset from the second element 510b, specifically, the rear portion of the second element 510b, to the negative direction side of the second direction Y when viewed from the third direction Z. In this case, electrical interference between the capacitive loading element 510 and the first satellite antenna 210 or the second satellite antenna 220 can be reduced, as compared with the case where the first satellite antenna 210 and the second satellite antenna 220 are disposed in the region where the capacitive loading element 510 is projected onto the antenna base 100.

The capacitive loading element 510 is provided on the front portion of the inner case 400. The height of the front portion of the inner case 400 in the third direction Z is lower than the height of the rear portion of the inner case 400 in the third direction Z. Accordingly, the length of the capacitive loading element 510 in the third direction Z is limited by the height of the inner case 400 in the third direction Z. When the distance between the capacitive loading element 510 and the metal base 110 cannot be increased, the performance of the third antenna 500 may decrease. In the present embodiment, the performance of the third antenna 500 does not significantly decrease by widening the width of the lower portion of the capacitive loading element 510 instead of being restricted in height in the third direction Z. Specifically, in the two facing elements, the interval between the lower portion of the first element 510a and the lower portion of the second element 510b is wider than the interval between the upper portion of the first element 510a and the upper portion of the second element 510b.

The first satellite antenna 210 is a Global Navigation Satellite System (GNSS) antenna, specifically, a GPS antenna. The first satellite antenna 210 however may be a satellite antenna different from the GNSS antenna. The first satellite antenna 210 is a patch antenna. Specifically, the first satellite antenna 210 has a thickness in the third direction Z. When viewed from the third direction Z, the first satellite antenna 210 is quadrangular, specifically, substantially rectangular or substantially square. The substantially rectangle means not only an exact rectangle but also a shape similar to an exact rectangle such as a rectangle with rounded corners and a rectangle with cut corners. The same applies to a substantially square. The substantially rectangular or substantially square of the first satellite antenna 210 has a pair of sides extending in the first direction X and another pair of sides extending in the second direction Y. The pair of sides and another pair of sides of the substantially rectangle or square of the first satellite antenna 210 however may be tilted by a certain angle such as 45 degrees with respect to the first direction X and the second direction Y, respectively. The certain angle is determined according to various factors. Since the first satellite antenna 210 is affected by the position of the third antenna 500, examples of this factor include a relationship between the position of the first satellite antenna 210 and the position of the third antenna 500.

The second satellite antenna 220 is a SiriusXM (SXM) antenna. The second satellite antenna 220 however may be a satellite antenna different from the SXM antenna. The second satellite antenna 220 is a patch antenna. Specifically, the second satellite antenna 220 has a thickness in the third direction Z. When viewed from the third direction Z, the second satellite antenna 220 is a quadrangle, specifically, substantially a rectangle or a square. The substantially rectangle means not only an exact rectangle but also a shape similar to an exact rectangle such as a rectangle with rounded corners and a rectangle with cut corners. The same applies to a substantially square. The substantially rectangle or substantially square of the second satellite antenna 220 has a pair of sides extending in the first direction X and another pair of sides extending in the second direction Y. The pair of sides and another pair of sides of the substantially rectangle or square of the second satellite antenna 220 however may be tilted by a certain angle such as 45 degrees with respect to the first direction X and the second direction Y, respectively. The certain angle is determined according to various factors. Since the second satellite antenna 220 is affected by the position of the third antenna 500, examples of this factor include a relationship between the position of the second satellite antenna 220 and the position of the third antenna 500. A passive element 222 is disposed in a region inside the inner case 400 facing the second satellite antenna 220. The antenna performance of the second satellite antenna 220 can be improved by the passive element 222. The passive element 222 may be disposed in a region outside the inner case 400 facing the second satellite antenna 220.

In the present embodiment, the size of the first satellite antenna 210 and the size of the second satellite antenna 220 are substantially the same. The size of the first satellite antenna 210 and the size of the second satellite antenna 220 however may be different from each other.

The vehicular antenna device 10 configured in this way operates as a multi-media composite antenna. Incidentally, the vehicular antenna device may desirably accommodate a large number of antennas, but the height and width are limited due to the shark fin shape. Accordingly, in order to accommodate many antennas, for example, it is conceivable to arrange the antennas in the front-rear direction. A plurality of antennas arranged in the front-rear direction, however, increases the length in the front-rear direction.

In the present embodiment, the first satellite antenna 210 and the second satellite antenna 220 are disposed offset from each other in the second direction Y. Specifically, the first satellite antenna 210 and the second satellite antenna 220 are disposed symmetrically with respect to a virtual plane P1 passing through the center line C of the antenna base 100 along the first direction X (hereinafter referred to as "virtual plane"). The center line C of the antenna base 100 includes not only the exact center of the antenna base 100 but also a substantially center. The substantially center indicates that it does not necessarily need to be an exact center. The first satellite antenna 210 is disposed offset in the positive direction of the second direction Y with respect to the virtual plane when viewed from the third direction Z, that is, when viewed from the top of the antenna base 100, and the second satellite antenna 220 is disposed offset in the negative direction of the second direction Y with respect to the virtual plane when viewed from the third direction Z, that is, when viewed from the top of the antenna base 100. The first satellite antenna 210 and the second satellite antenna 220 however may be disposed asymmetrically with respect to the virtual plane. One of the first satellite antenna 210 and the second satellite antenna 220 may be located on the virtual plane. The first satellite antenna 210 and the second satellite antenna 220 may be disposed such that the centers thereof are disposed offset in the second direction Y with respect to the virtual plane. The virtual plane is a plane parallel to the longitudinal direction of the antenna base 100. The parallel to the longitudinal direction of the antenna base 100 includes not only being exactly parallel but also being substantially parallel. This substantially parallel indicates that it does not necessarily need to be exactly parallel.

In the present embodiment, the virtual plane passing through the center of the antenna base 100 along the first direction X passes through the fixing portion 112, the first antenna 310, and the second antenna 320. Thus, in the present embodiment, it can also be understood that the first satellite antenna 210 and the second satellite antenna 220 are disposed offset in the second direction Y with respect to the virtual plane passing through the fixing portion 112, the first antenna 310, or the second antenna 320 along the first direction X. In this case, it can also be understood that the first satellite antenna 210 and the second satellite antenna 220 are disposed offset in the second direction Y with respect to the virtual plane passing through the center of the fixing portion 112 along the first direction X. The first satellite antenna 210 is disposed offset in the positive direction of the second direction Y with respect to the fixing portion 112 of the antenna base 100. Similarly, the second satellite antenna 220 is disposed offset in the negative direction of the second direction Y with respect to the fixing portion 112 of the antenna base 100. The first satellite antenna 210 and the second satellite antenna 220 with low heights disposed offset in the second direction Y enables to mount many antennas while maintaining the length in the X direction. The appearance of the antenna can be maintained without increasing the size (width) of the upper part of the case in the Y direction.

Figure 5:
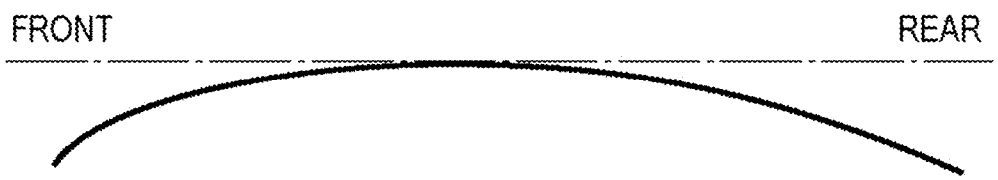
FIG. 5 is a diagram schematically showing a cross section of a roof of a vehicle along a front-rear direction.
Figure 6:
FIG. 6 is a diagram schematically showing a cross section of the roof of the vehicle along a left-right direction.

An example of the relationship between the curvature in the front-rear direction of the roof of an automobile and the curvature in the left-right direction of the roof of an automobile will be described with reference to FIGS. 5 and 6. FIG. 5 is a diagram schematically showing a cross section of a roof of a vehicle along the front-rear direction. FIG. 6 is a diagram schematically showing a cross section of a roof of a vehicle along the left-right direction. In FIG. 5, the solid line indicates the roof of the automobile, and the dash dot line indicates the direction parallel to the front-rear direction of the automobile. In FIG. 6, the solid line indicates the roof of the automobile, and the dash dot line indicates the direction parallel to the left-right direction of the automobile.

As shown in FIGS. 5 and 6, the roof of an automobile has a curvature in the front-rear direction of the automobile and in the left-right direction of the automobile. As shown in FIGS. 5 and 6, the radius of curvature in the front-rear direction of the roof of the automobile is generally smaller than the radius of curvature in the left-right direction of the roof of the automobile. That is, in the present embodiment, the radius of curvature in the first direction X of the roof of the automobile on which the vehicular antenna device 10 is mounted may be smaller than the radius of curvature in the second direction Y of the roof. The distance between the antenna base 100 and the roof in the third direction Z is closest at the fixing portion 112. The distance between the antenna base 100 and the roof in the third direction Z increases away from the fixing portion 112 in the first direction X and the second direction Y. Accordingly, in the present embodiment, the distance between the first satellite antenna 210 and the roof can be shortened, as compared with the case where the first satellite antenna 210 is located on the virtual plane passing through the fixing portion 112 along the first direction X.

Figure 7:
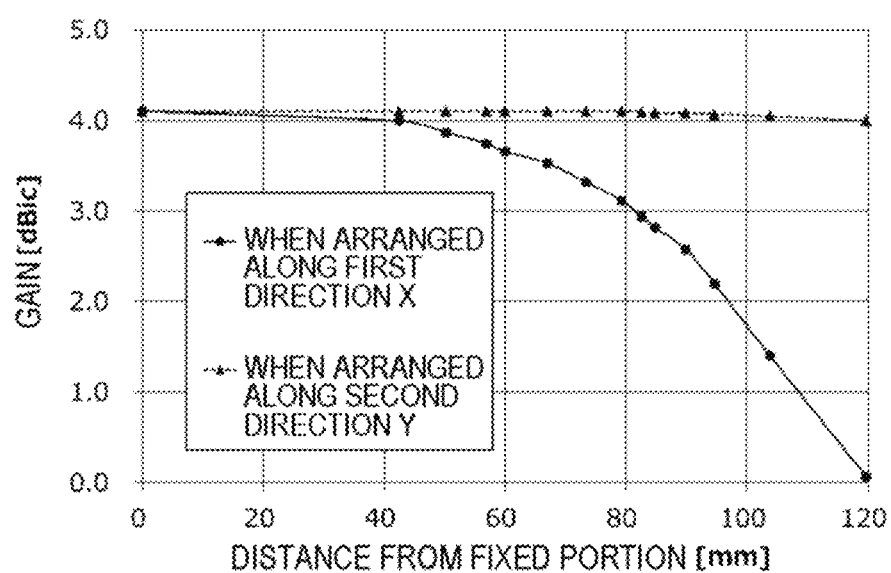
FIG. 7 is a diagram showing an example of the amount of change in a zenith gain when the height from the roof to a satellite antenna mounting surface fluctuates.

With reference to FIG. 7, the change in the antenna performance of the satellite antenna due to the distance between the satellite antenna and the roof will be described. FIG. 7 is a diagram showing an example of the amount of change in a zenith gain when the height from the roof to a satellite antenna mounting surface fluctuates. In FIG. 7, the X-axis shows the distance from the fixing portion 112 to the satellite antenna, and the Y-axis shows the zenith gain of the satellite antenna. FIG. 7 shows the change in the zenith gain of the SXM wave band when the satellite antenna is moved parallel to the first direction X or the second direction Y. FIG. 7 indicates an example for the case where the radius of the first direction X is 900 mm and the radius of the second direction Y is 10000 mm is used as an example. That is, in the case of FIG. 7, the radius of curvature in the first direction X is smaller than the radius of curvature in the second direction Y. As shown in FIG. 7, when the satellite antenna is translated in the first direction X, the zenith gain decreases as the distance between the satellite antenna and the fixing portion 112 increases. On the other hand, when the satellite antenna is translated in the second direction Y, the zenith gain hardly changes even when the distance between the satellite antenna and the fixing portion 112 increases. In other words, as the height from the roof to the satellite antenna mounting surface increases, the antenna performance of the satellite antenna at the high elevation angle decreases. That is, as the height from the roof to the satellite antenna mounting surface increases due to the curvature, the gain decreases. As described above, the radius of curvature in the front-rear direction of the roof of the automobile is generally smaller than the radius of curvature in the left-right direction of the roof of the automobile. That is, even when the distance between the satellite antenna and the fixing portion 112 is the same, the height from the roof to the satellite antennas mounting surface is higher when the satellite antenna and the fixing portion 112 are spaced along the front-rear direction of the automobile roof than when the satellite antenna and the fixing portion 112 are spaced along the left-right direction of the automobile roof. Accordingly, the gain of the satellite antenna further decreases. According to the present embodiment, the characteristics of the first satellite antenna 210 can be improved, as compared with the case where the first satellite antenna 210 is located on the virtual plane passing through the fixing portion 112 along the first direction X. Similarly, the characteristics of the second satellite antenna 220 can be improved, as compared with the case where the second satellite antenna 220 is located on the virtual plane passing through the fixing portion 112 along the first direction X.

From the above description, considering the antenna performance of each of the first satellite antenna 210 and the second satellite antenna 220, it is preferable that the first satellite antenna 210 and the second satellite antenna 220 are disposed at a position offset in the second direction Y with respect to the virtual plane, and in the vicinity of the fixing portion 112. The vicinity of the fixing portion 112 for the first satellite antenna 210 means that, for example, when viewed from the third direction Z, at least a part of the first satellite antenna 210 is located in a position displaced with respect to the virtual plane along the second direction Y, and is located in a region within 100 mm from the center of the fixing portion 112. The same applies to the vicinity of the fixing portion 112 for the second satellite antenna 220.

From the above description, it is preferable that the first satellite antenna 210 and the second satellite antenna 220 are not significantly offset from the fixing portion 112 in the first direction X. For example, when viewed from the third direction Z, the first satellite antenna 210 is preferably disposed such that at least a part of the first satellite antenna 210 overlaps a virtual line L1 passing through any part, preferably, the central part of the fixing portion 112 along the second direction Y (hereinafter referred to as "virtual line"). The virtual line intersects, preferably, orthogonal to the virtual plane along the first direction X. In other words, the virtual line is a virtual line that intersects, preferably, orthogonal to the vehicle front-rear direction. The same applies to the second satellite antenna 220.

In the present embodiment, the first satellite antenna 210 and the second satellite antenna 220 are disposed offset by an equal distance from the fixing portion 112 of the antenna base 100 in the second direction Y. The distance between the first satellite antenna 210 and the fixing portion 112 in the second direction Y and the distance between the second satellite antenna 220 and the fixing portion 112 in the second direction Y, however, may be different from each other. For example, depending on the characteristics of the first satellite antenna 210 or the second satellite antenna 220, the optimum distance between the first satellite antenna 210 and the fixing portion 112 in the second direction Y, and the optimum distance between the second satellite antenna 220 and the fixing portion 112 in the second direction Y are determined independently of each other. This may result in difference between the distance between the first satellite antenna 210 and the fixing portion 112 in the second direction Y and the distance between the second satellite antenna 220 and the fixing portion 112 in the second direction Y.

When viewed from the third direction Z, the center of the fixing portion 112 and the center of the first satellite antenna 210 do not need to be located on the same straight line extending along the second direction Y. For example, when viewed from the third direction Z, the virtual plane passing through one of the fixing portion 112 and the first satellite antenna 210 along the second direction Y may pass through any part of the other of the fixing portion 112 and the first satellite antenna 210. Similarly, when viewed from the third direction Z, the center of the fixing portion 112 and the center of the second satellite antenna 220 do not need to be located on the same straight line extending along the second direction Y. For example, when viewed from the third direction Z, the virtual plane passing through any part of one of the fixing portion 112 and the second satellite antenna 220 along the second direction Y may pass through any part of the other of the fixing portion 112 and the second satellite antenna 220.

When viewed from the third direction Z, the center of the first satellite antenna 210 and the center of the second satellite antenna 220 are located on the same straight line extending along the second direction Y. The center of the first satellite antenna 210 and the center of the second satellite antenna 220 however may not be located on the same straight line extending along the second direction Y. For example, when viewed from the third direction Z, the virtual plane passing through any part of one of the first satellite antenna 210 and the second satellite antenna 220 along the second direction Y may pass through any part of the other of the first satellite antenna 210 and the second satellite antenna 220.

The first satellite antenna 210 and the second satellite antenna 220 overlap with the metal base 110 in the third direction Z. Accordingly, the metal base 110 can function as a shield cover to shield the Low Noise Amplifier (LNA) of the first satellite antenna 210 and the second satellite antenna 220 from external noise.

Modification Example

FIG. 8 is a schematic front view showing an example of a vehicular antenna device 10 according to a modification example. The vehicular antenna device 10 according to the present modification example is the same as the vehicular antenna device 10 according to the embodiment, except for the following points. That is, the vehicular antenna device 10 does not include the second satellite antenna 220. Instead, the vehicular antenna device 10 includes the second antenna 320 at the position where the second satellite antenna 220 was provided in the embodiment. In the present modification example, the second antenna 320 is a TEL antenna. In FIG. 8, for convenience of explanation, the inner case 400, the third antenna 500, and the antenna case 600 are not shown. In FIG. 8, the white circle with a black dot indicating the first direction X indicates that the positive direction of the first direction X is a direction from the back to the front of the paper surface of FIG. 8, and the negative direction of the first direction X is a direction from the front to the back of the paper surface of FIG. 8.

The upper portion of the second antenna 320 is inclined diagonally with respect to the third direction Z in accordance with the shape of the inner case 400 shown in FIG. 2. Accordingly, the second antenna 320 can be a low-profile antenna, as compared with the case where the upper portion of the second antenna 320 is not inclined diagonally. When the second antenna 320 is inclined diagonally, not only the upper portion of the second antenna 320 may be inclined diagonally, but also the entire second antenna 320 may be inclined according to the shape of the inner case 400.

When the use frequency band of the second antenna 320 is limited to the high-frequency band, the antenna length of the second antenna 320 can be shortened. When the use frequency band is limited to the high-frequency band, a low-profile second antenna 320 may be disposed. For example, a vacant lot may be provided by not disposing at least one of the first satellite antenna 210 and the second satellite antenna 220, and the low-profile second antenna 320 may be disposed in this vacant lot.

Although the embodiment and modification examples of the present invention have been described above with reference to the drawings, these are examples of the present invention, and various configurations other than the above may be adopted.

For example, in the present embodiment, two satellite antennas are provided on the antenna base 100. The number of satellite antennas provided on the antenna base 100 however may be only one, or may be three or more. When one satellite antenna is provided, the satellite antenna is disposed offset from the virtual plane in either left or right direction. When three satellite antennas are provided, the three satellite antennas may be disposed offset from the virtual plane in the left-right direction. Alternatively, two satellite antennas may be disposed offset in the left-right direction, and one satellite antenna may be disposed not to be offset from the virtual plane in the left-right direction in the vicinity of the fixing portion 112 or may be disposed not to be offset from the virtual plane in front of the fixing portion 112. Similarly, when two satellite antennas are provided, the two satellite antennas may be disposed offset in the left-right direction. Alternatively, one satellite antenna may be disposed offset from the virtual plane in either left or right direction, and one satellite antenna may be disposed not to be offset from the virtual plane in the left-right direction in the vicinity of the fixing portion 112 or may be disposed not to be offset from the virtual plane in front of the fixing portion 112.

In the present embodiment, not only satellite antennas such as the first satellite antenna 210 and the second satellite antenna 220 but also antennas different from satellite antennas, such as the first antenna 310, the second antenna 320, and the third antenna 500 are provided on the antenna base 100. Only the satellite antenna however may be provided on the antenna base 100.

In the present embodiment, the first antenna 310, the second antenna 320, and the third antenna 500 have been described as an example of the antenna included in the vehicular antenna device 10, but the embodiment is not limited thereto. For example, the type of antenna included in the vehicular antenna device 10 can be arbitrarily changed.

More specifically, the vehicular antenna device 10 may have a plurality of antennas operating in the same frequency band. Similarly, in the vehicular antenna device 10, the first satellite antenna 210 and the second satellite antenna may be antennas operating in the same frequency band. For example, Multiple-Input and Multiple-Output (MIMO) may be provided by mounting a plurality of TEL antennas operating in at least partially the same frequency band. A plurality of GNSS antennas operating in another frequency band may be disposed.

In the present embodiment, each element of the capacitive loading element 510 has a vertical meander shape with a vertically folded structure. Each element however may have a horizontal meander shape with a horizontally folded structure. Alternatively, each element may have both a vertical meander shape and a horizontal meander shape. Each element may have a slit. Each element may be a plate shape without having a shape such as a meander or a slit.

Figure 9:
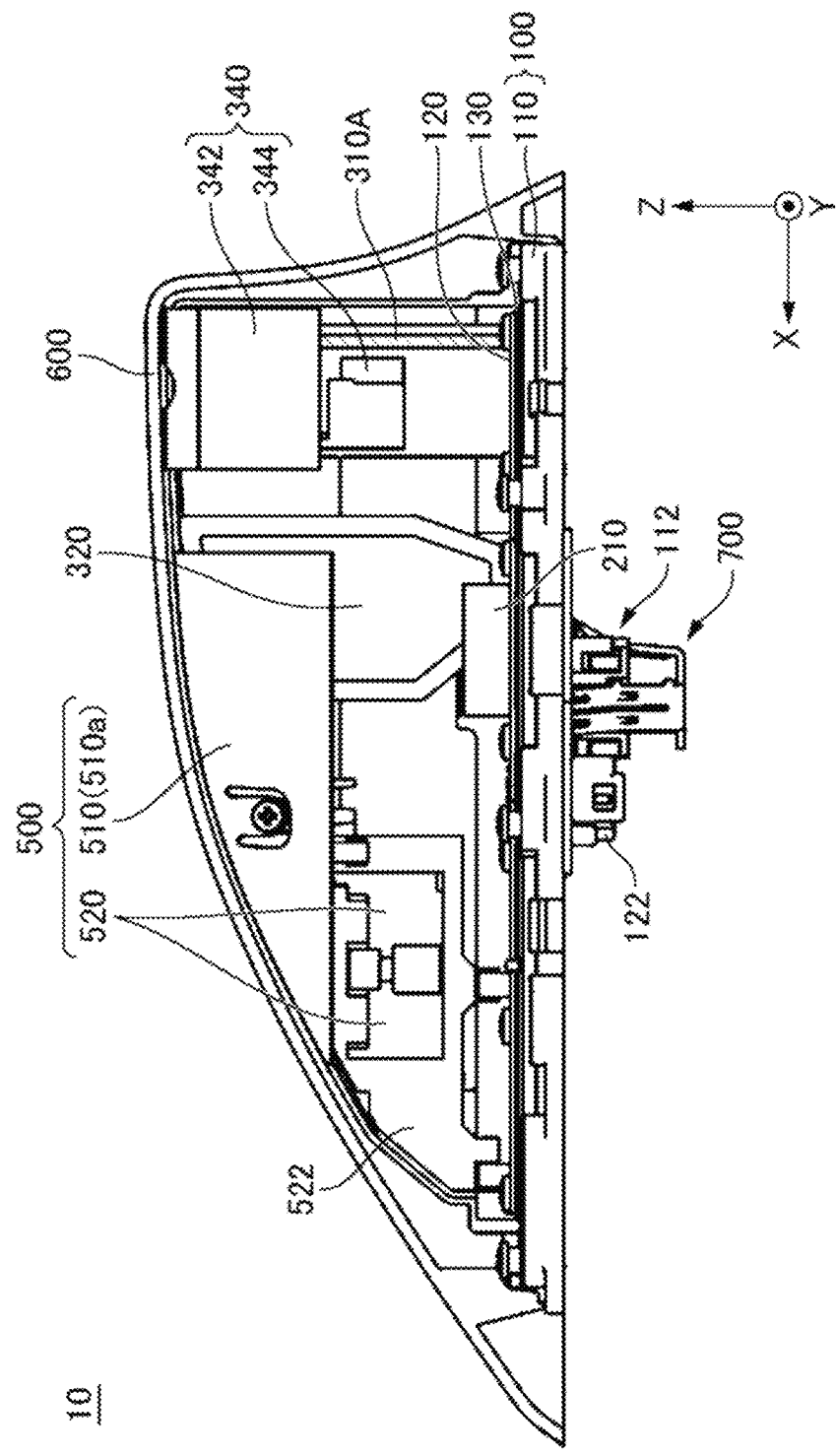
FIG. 9 is a diagram showing a first modification example of FIG. 3.

In the present embodiment, it has been described that the second antenna 320 is disposed below the capacitive loading element 510, but the embodiment is not limited to this. For example, the first antenna 310 may be disposed below the capacitive loading element 510. Alternatively, in the vehicular antenna device 10, a fourth antenna 340 operating in another frequency band may be disposed above the first antenna 310A. In the example shown in FIG. 9, in the vehicular antenna device 10, the first antenna 310A is disposed below the fourth antenna 340. FIG. 9 is a diagram showing a first modification example of FIG. 3. The fourth antenna 340 is a DAB antenna having a capacitive loading element 342 and a helical element 344 and operating in a Digital Audio Broadcast (DAB) wave band. The first antenna 310A is formed in a pattern on the substrate. A part of the DAB antenna may be provided with a function of acting as a reflector of the V2X antenna.

Figure 10:
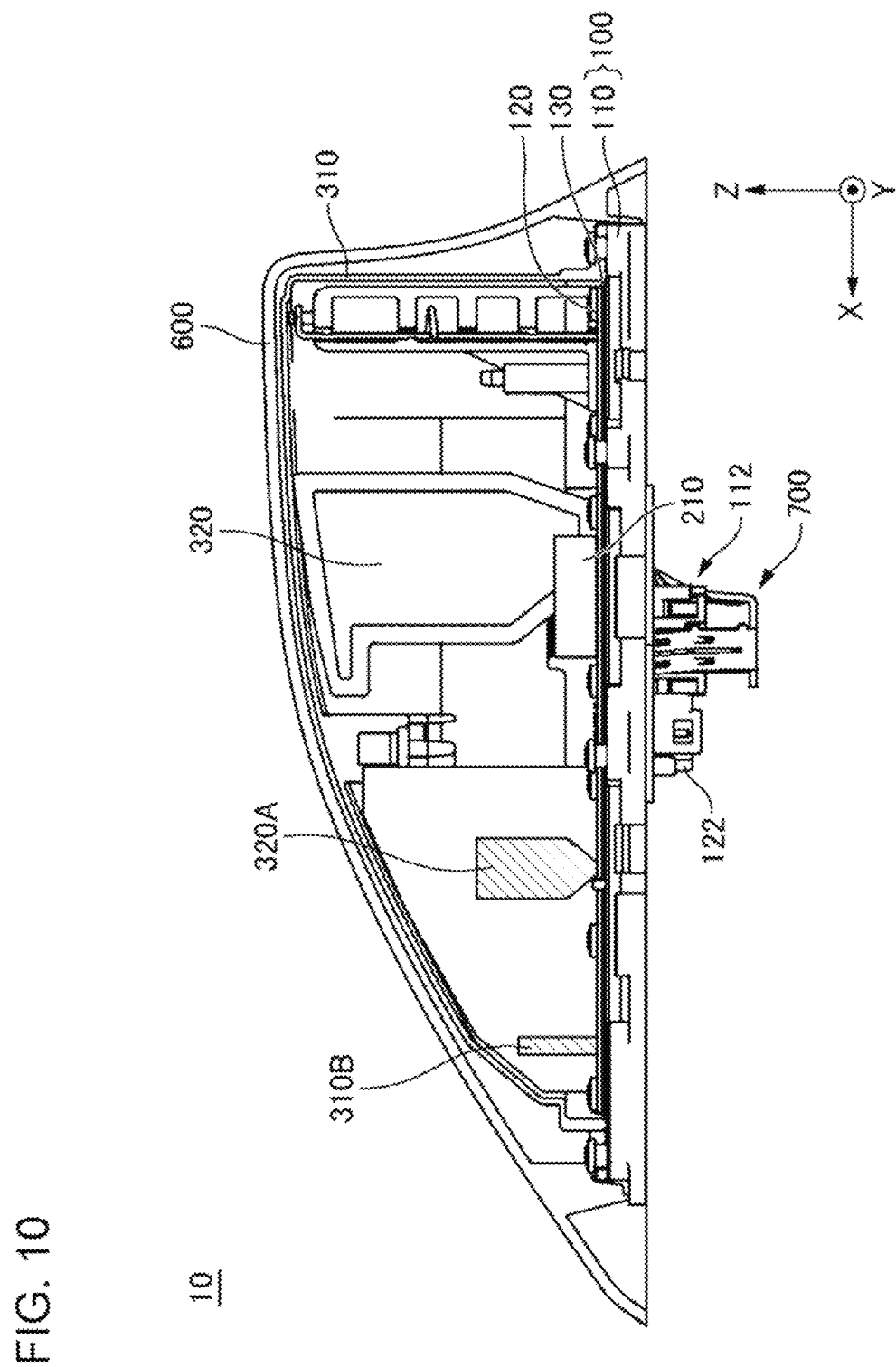
FIG. 10 is a diagram showing a second modification example of FIG. 3.

In the present embodiment, the case where one first antenna 310 is disposed has been described, but the embodiment is not limited to this. For example, as shown in FIG. 10, in the vehicular antenna device 10, V2X antennas may be disposed on the front side and the rear side. FIG. 10 is a diagram showing a second modification example of FIG. 3. More specifically, in the vehicular antenna device 10, the first antenna 310 as a V2X antenna is disposed on the rear side, and the first antenna 310B as a V2X antenna is disposed on the front side. The first antenna 310B is formed in a pattern on the substrate. The first antenna 310B may be disposed not as a V2X antenna but as an antenna operating in the Internet frequency band (Wi-Fi (registered trademark)).

Figure 11:
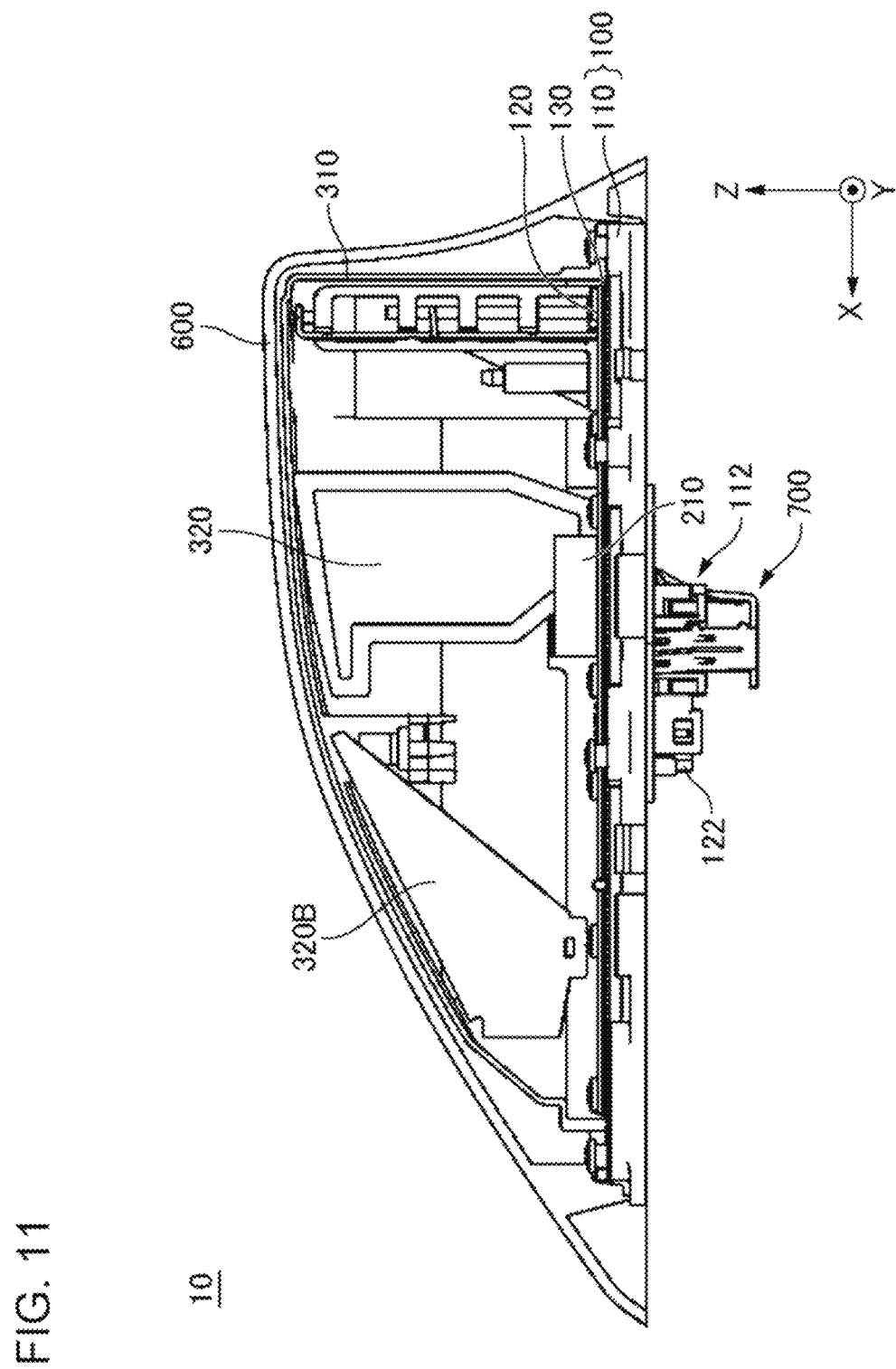
FIG. 11 is a diagram showing a third modification example of FIG. 3.

As shown in FIG. 11, a second antenna 320B as a TEL antenna may be further formed on the substrate. FIG. 11 is a diagram showing a third modification example of FIG. 3. That is, the vehicular antenna device 10 may be configured to have two TELs. When the vehicular antenna device 10 has two TEL antennas, the vehicular antenna device 10 may be configured to have a second antenna 320 formed of sheet metal and a second antenna 320B formed of sheet metal, as shown in FIG. 11.

According to the present specification, the following aspects are provided.

(Aspect 1)

Aspect 1 is a vehicular antenna device including:
an antenna base having a longitudinal direction; and
a first antenna portion provided over the antenna base, in which
the first antenna portion is disposed offset in a direction intersecting a virtual plane parallel to the longitudinal direction.

The radius of curvature of the roof of the automobile in the front-rear direction is generally smaller than the radius of curvature of the roof of the automobile in the left-right direction. In Aspect 1, the first antenna portion is disposed offset in a direction intersecting a virtual plane parallel to the longitudinal direction. In other words, the first antenna portion is disposed in the left-right direction having a larger radius of curvature than in the front-rear direction. Thus, according to Aspect 1, the change in the distance between the first antenna portion and the roof can be reduced as compared with the case where the first antenna portion is disposed offset in the longitudinal direction. Accordingly, the characteristics of the first antenna portion can be improved.

(Aspect 2)

Aspect 2 is the vehicular antenna device according to Aspect 1, in which
the virtual plane passes through a center of the antenna base.

According to Aspect 2, the change in the distance between the first antenna portion and the roof can be reduced as compared with the case where the first antenna portion is disposed offset in the longitudinal direction. Accordingly, the characteristics of the first antenna portion can be improved.

(Aspect 3)

Aspect 3 is the vehicular antenna device according to Aspect 1 or 2, further including:
a second antenna portion provided over the antenna base, in which
the virtual plane passes through the second antenna portion.

According to Aspect 3, the change in the distance between the first antenna portion and the roof can be reduced as compared with the case where the first antenna portion is disposed offset in the longitudinal direction. Accordingly, the characteristics of the first antenna portion can be improved.

(Aspect 4)

Aspect 4 is the vehicular antenna device according to any one of Aspects 1 to 3, in which the virtual plane passes through a fixing portion to fix the antenna base to a vehicle, the fixing portion being provided on the antenna base.

According to Aspect 4, the change in the distance between the first antenna portion and the roof can be reduced as compared with the case where the first antenna portion is disposed offset in the longitudinal direction from the fixing portion. Accordingly, the characteristics of the first antenna portion can be improved.

(Aspect 5)

Aspect 5 is the vehicular antenna device according to Aspect 4, in which
the first antenna portion is disposed such that at least a part of the first antenna portion overlaps with a virtual line parallel to the direction intersecting the virtual plane, the virtual line passing through any part of the fixing portion.

According to Aspect 5, the characteristics of the first antenna portion can be improved as compared with the case where any portion of the first antenna portion does not overlap with the virtual line.

(Aspect 6)

Aspect 6 is the vehicular antenna device according to Aspect 5, in which the virtual line is orthogonal to the virtual plane.

According to Aspect 6, the characteristics of the first antenna portion can be improved as compared with the case where the virtual line diagonally intersects the virtual plane.

(Aspect 7)

Aspect 7 is the vehicular antenna device according to any one of Aspects 4 to 6, in which the first antenna portion is disposed at a position offset in the direction intersecting the virtual plane, the position being in the vicinity of the fixing portion.

According to Aspect 7, the characteristics of the first antenna portion can be improved as compared with the case where the first antenna portion is located far away from the fixing portion.

(Aspect 8)

Aspect 8 is the vehicular antenna device according to any one of Aspects 1 to 7, in which the first antenna portion is a satellite antenna to receive radio waves from a satellite.

According to Aspect 8, the characteristics of the satellite antenna can be improved.

(Aspect 9)

Aspect 9 is the vehicular antenna device according to any one of Aspects 1 to 8, in which
- the first antenna portion includes a first satellite antenna and a second satellite antenna, and
- the first satellite antenna and the second satellite antenna are provided over the antenna base, and are disposed offset in the direction intersecting the virtual plane.

According to Aspect 9, the characteristics of both the first satellite antenna and the second satellite antenna can be improved.

(Aspect 10)

Aspect 10 is the vehicular antenna device according to any one of Aspects 1 to 9, further including:
- a capacitive loading element provided over the antenna base, in which
- the first antenna portion is disposed outside a region where the capacitive loading element is projected onto the antenna base.

According to the tenth aspect, the electrical interference between the first antenna portion and the capacitive loading element can be prevented, as compared with the case where the first antenna portion is disposed in the region where the capacitive loading element is projected onto the antenna base.

(Aspect 11)

Aspect 11 is a vehicular antenna device including:
- an antenna base; and
- a first antenna portion provided on the antenna base, in which
- a center of the first antenna portion is disposed offset in a left-right direction with respect to a center line along a front-rear direction of the antenna base when viewed from a top of the antenna base.

According to Aspect 11, the characteristics of the first antenna portion can be improved in the same manner as in Aspect 1.

This application claims priority based on Japanese Patent Application No. 2020-030341, filed Feb. 26, 2020, the entire disclosure of which is incorporated herein.

REFERENCE SIGNS LIST 10 vehicular antenna device
100 antenna base
110 metal base
112 fixing portion
114 hole
120 first substrate
122 connector
130 pad
140 seal member
210 first satellite antenna
220 second satellite antenna
222 passive element
310 first antenna
310A first antenna
310B first antenna
320 second antenna
320A second antenna
320B second antenna
340 fourth antenna
342 capacitive loading element
344 helical element
400 inner case
500 third antenna
510 capacitive loading element
510a first element
510b second element
512: coupling member
514: connecting member
520 helical element
522 second substrate
600 antenna case
700 antenna attaching portion
710 bolt
720 washer
730 holder
X first direction
Y second direction
Z third direction

The invention claimed is:

1. A vehicular antenna device comprising:
an antenna base having a longitudinal direction;
a fixing portion projecting from a first side of the antenna base, the fixing portion being configured to fix the antenna base to a vehicle;
a first antenna portion provided on a second side of the antenna base opposite to the first side of the antenna base; and
a capacitive loading element provided on the second side of the antenna base,
wherein the first antenna portion is disposed offset in a first direction orthogonal to a virtual plane parallel to the longitudinal direction,
wherein the first antenna portion is at least partially disposed offset in the first direction with respect to a region that is coplanar with the first antenna portion, and
wherein the region is at least partially overlapping with the fixing portion and the capacitive loading element.

2. The vehicular antenna device according to claim 1, wherein
the virtual plane passes through a center of the antenna base.

3. The vehicular antenna device according to claim 1, further comprising:
a second antenna portion provided on the second side of the antenna base, wherein
the virtual plane passes through the second antenna portion.

4. The vehicular antenna device according to claim 1, wherein
the virtual plane passes through the fixing portion.

5. The vehicular antenna device according to claim 4, wherein
the first antenna portion is disposed such that at least a part of the first antenna portion overlaps with a virtual line parallel to the first direction, the virtual line passing through any part of the fixing portion.

6. The vehicular antenna device according to claim 5, wherein
the virtual line is orthogonal to the virtual plane.

7. The vehicular antenna device according to claim 1,
the first antenna portion is disposed at a position that is offset in the first direction, the position being in the vicinity of the fixing portion.

8. The vehicular antenna device according to claim 1, wherein
the first antenna portion is a satellite antenna to receive radio waves from a satellite.

9. The vehicular antenna device according to claim 1, wherein
the first antenna portion includes a first satellite antenna and a second satellite antenna, and
the first satellite antenna and the second satellite antenna are provided on the second side of the antenna base and are disposed offset in the first direction.

10. A vehicular antenna device comprising:
an antenna base;
a fixing portion projecting from a lower side of the antenna base, the fixing portion being configured to fix the antenna base to a vehicle;
a first antenna portion provided on an upper side of the antenna base; and
a capacitive loading element provided on the upper side of the antenna base,
wherein a center of the first antenna portion is disposed offset in a left-right direction with respect to a center line along a front-rear direction of the antenna base when viewed from a top of the antenna base,
wherein the center of the first antenna portion is disposed offset in the left-right direction with respect to a region that is coplanar with the first antenna portion, and
wherein the region is at least partially overlapping with the fixing portion and the capacitive loading element.

* * * * *